US008073226B2

(12) United States Patent
Farag et al.

(10) Patent No.: US 8,073,226 B2
(45) Date of Patent: Dec. 6, 2011

(54) AUTOMATIC DETECTION AND MONITORING OF NODULES AND SHAPED TARGETS IN IMAGE DATA

(75) Inventors: Aly A. Farag, Louisville, KY (US); Ayman El-Baz, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 1182 days.

(21) Appl. No.: 11/824,669

(22) Filed: Jul. 2, 2007

(65) Prior Publication Data

US 2008/0002870 A1    Jan. 3, 2008

Related U.S. Application Data

(60) Provisional application No. 60/817,797, filed on Jun. 30, 2006.

(51) Int. Cl.
*G06K 9/00* (2006.01)
(52) U.S. Cl. ............... 382/131; 378/4; 378/21
(58) Field of Classification Search ............ 382/128, 382/130, 131; 378/4, 21; 128/922; 600/425, 600/443
See application file for complete search history.

(56) References Cited

U.S. PATENT DOCUMENTS

| | | | |
|---|---|---|---|
| 7,529,395 B2 * | 5/2009 | Cathier et al. | 382/128 |
| 2003/0053669 A1 * | 3/2003 | Suri et al. | 382/130 |
| 2004/0086162 A1 * | 5/2004 | Doi et al. | 382/131 |
| 2005/0152588 A1 * | 7/2005 | Yoshida et al. | 382/128 |
| 2005/0195185 A1 * | 9/2005 | Slabaugh et al. | 345/419 |
| 2006/0013482 A1 * | 1/2006 | Dawant et al. | 382/173 |
| 2006/0056701 A1 * | 3/2006 | Unal et al. | 382/199 |
| 2006/0120591 A1 * | 6/2006 | Cathier et al. | 382/154 |
| 2009/0252395 A1 * | 10/2009 | Chan et al. | 382/131 |

OTHER PUBLICATIONS

Farag et al. "Detection and Recognition of Lung Abnormality Using Deformable Templates", Proceeding of the 17th International conference, IEEE, Aug. 23-26, 2004.*

(Continued)

*Primary Examiner* — Jason M Repko
*Assistant Examiner* — Shervin Nakhjavan
(74) *Attorney, Agent, or Firm* — Wood, Herron & Evans, LLP

(57) ABSTRACT

A method for detecting a nodule in image data including the steps of segmenting scanning information from an image slice to isolate lung tissue from other structures, resulting in segmented image data; extracting anatomic structures, including any potential nodules, from the segmented image data, resulting in extracted image data; and detecting possible nodules from the extracted image data, based on deformable prototypes of candidates generated by a level set method in combination with a marginal gray level distribution method. Embodiments of the invention also relate to an automatic method for detecting and monitoring a nodule in image data, where the method includes the steps of determining adaptive probability models of visual appearance of small 2D and large 3D nodules to control evolution of deformable models to get accurate segmentation of pulmonary nodules from image data; modeling a first set of nodules in image data with a translation and rotation invariant Markov-Gibbs random field (MGRF) of voxel intensities with pairwise interaction analytically identified from a set of training nodules; modeling a second subsequent set of nodules in image data by estimating a linear combination of discrete Gaussians; and integrating both models to guide the evolution of the deformable model to determine and monitor the boundary of each detected nodule in the image data.

15 Claims, 10 Drawing Sheets

OTHER PUBLICATIONS

Takagi et al. ("Computerized characterization of Contrast Enhancement Patterns for Classifying Pulmonary Nodules" IEEE, 2000).*

Malladi et al. ("Shape Modeling With Front Propagation: A Level Set Approach", IEEE transaction, Feb. 1995).*

S. C. B., M. T. Freedman, J. S. Lin, and S. K. Mun, "Automatic lung nodule detection using profile matching and back-propagation neural network techniques," J. Digital Imaging, vol. 6, pp. 48-54, 1993.

S. Chang, H. Emoto, D. N. Metaxas, and L. Axe, "Pulmonary Micronodule detection from 3D Chest CT," Proc. MICCAI, Saint-Malo, France, Sep. 26-29, 2004, pp. 821-828, 2004.

Y. Lee, T. Hara, H. Fujita, S. Itoh, and T. Ishigaki, "Automated Detection of Pulmonary, Nodules in Helical CT Images Based on an Improved Template-Matching Technique," IEEE Trans. on Medical Imaging, vol. 20, pp. 595-604, 2001.

K. Kanazawa, Y. Kawata, N. Niki, H. Satoh, H. Ohmatsu, R. Kakinuma, M. Kaneko, N. Moriyma, and K. Eguchi, "Computer-aided diagnosis for pulmonary nodules based on helical CT images," IEEE, pp. 1635-1639, 1998.

Y. Kawata, N. Niki, H. Ohmatsu, M. Kusumoto, R. Kakinuma, K. Mori, H. Nishiyama, K. Eguchi, M. Kaneko, N. Moriyama, "Computer-Aided Diagnosis of Pulmonary Nodules Using Three-Dimensional Thoracic CT Images," Proc. Miccai, Utrecht, Netherlands, Oct. 14-17, 2001, pp. 1393-1394, 2001.

M. S. Brown, M. F. McNitt-Gray, J. G. Goldin, R. D. Suh, J. W. Sayre, and D. R. Aberle "Patient-Specific Models for Lung Nodule Detection and Surveillance in CT Images,"IEEE Trans. on Medical Imaging, vol. 20, pp. 1242-1250, 2001.

S. C. B. Lo, S. L. A. Lou, J. S. Lin, M. T. Freedman, M. V. Chien, and S. K. Mun, "Artificial convolution neural network techniques and applications for lung nodule detection," IEEE Trans. on Medical Imaging, vol. 14, 1995, pp. 711-718.

G. Gimel'farb, A. A. Farag, and A. El-Baz, "Expectation-Maximization for a linear combination of Gaussians", in Proc. IAPR Int. Conf. Pattern Recognition (ICPR 2004), Cambridge, UK, Aug. 23-26, 2004, vol. 2, pp. 422-425, 2004.

J.A. Sethian, Level Set Methods and Fast Marching Methods, Cambridge University Press, USA, pp. 214-223, 1999.

J. Gomes and O. Faugeras, Reconciling distance functions and level-sets. Technical Report 3666, INRIA, Apr. 1999.

N. Paragios and R. Deriche, "Unifying boundary and region-based information for geodesic active tracking," Proc. CVPR, Fort Collins, Colorado, Jun. 1999, vol. 2, pp. 300-305, 1999.

M. Kass, A. Witkin, and D. Terzopoulos, "Snakes: Active contour models," International Journal of Computer Vision, vol. 1, pp. 1 321-331, 1987.

H. Su, W. Qian, R. Sankar, and X. Sun., A New Knowledge-Based Lung Nodule Detection System, IEEE, pp. V-445 through V-448, 2004.

Aly A. Farag, Ayman S. El-Baz, Georgy Gimel'farb, "Precise Segmentation of Multimodal Images," IEEE Transactions on Image Processing, vol. 15, No. 4, pp. 952-968, Apr. 2006.

Aly Farag, Ayman El-Baz, Georgy G. Gimel'farb, Robert Falk, and Stephen G. Hushek, "Automatic Detection and Recognition of Lung abnormalities in Helical CT Images Using Deformable Templates," MICCAI 2004, LNCS 321, p. 856-864, 2004.

* cited by examiner

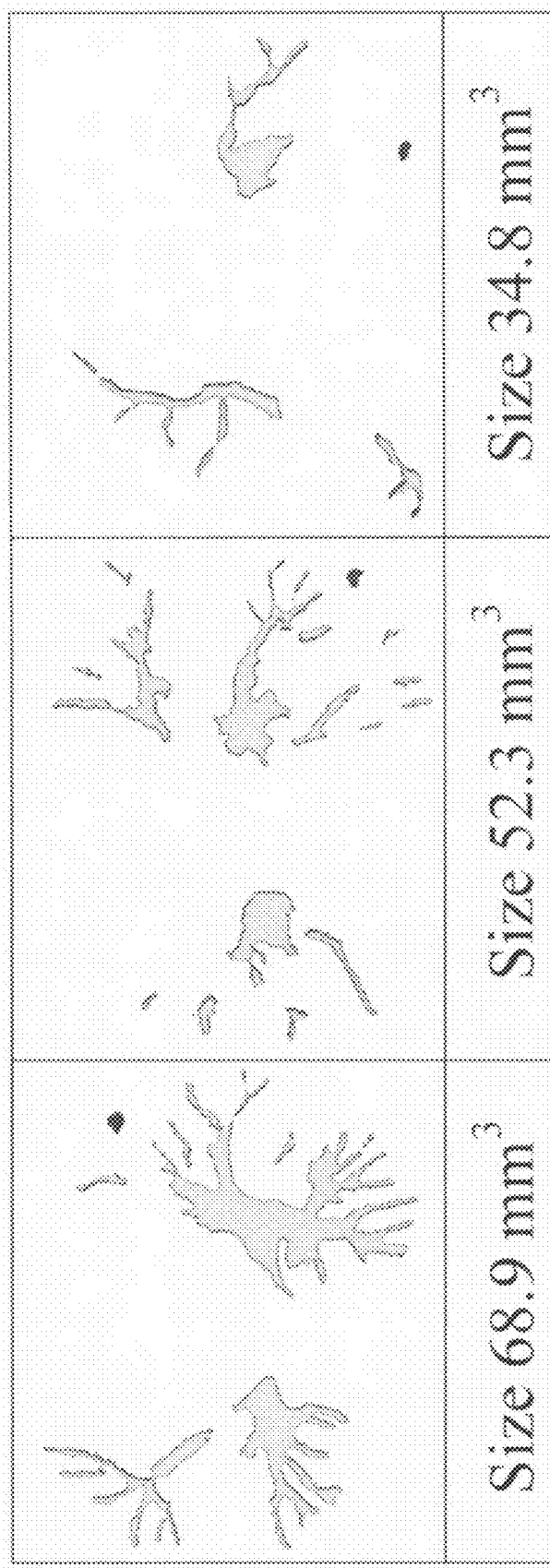
Fig. 7(A)  Size 68.9 mm³
Fig. 7(B)  Size 52.3 mm³
Fig. 7(C)  Size 34.8 mm³

AUTOMATIC DETECTION AND MONITORING OF NODULES AND SHAPED TARGETS IN IMAGE DATA

CLAIM FOR PRIORITY AND REFERENCE TO RELATED APPLICATION

This application claims priority under 35 U.S.C. §119 from prior provisional application Ser. No. 60/817,797, filed Jun. 30, 2006.

FIELD

A field of the invention is image analysis. Embodiments of the invention concern the automatic detection and monitoring of nodules, or other shaped targets, from image data, including image data of the lungs.

BACKGROUND

Lung Cancer remains the leading cause of mortality cancer. In 1999, there were approximately 170,000 new cases of lung cancer in the U.S., where approximately one in every eighteen women and approximately one in every twelve men develop lung cancer. Early detection of lung tumors (visible on chest film as nodules) may increase the patient's chance of survival, but detecting nodules is a complicated task. Nodules show up as relatively low-contrast white circular objects within the lung fields. The difficulty for computer aided image data search schemes is distinguishing true nodules from (overlapping) shadows, vessels and ribs.

The early stage detection of lung cancer remains an important goal in medical research. Regular chest radiography and sputum examination programs haven proven ineffective in reducing mortality rates. Although screening for lung cancer with chest X-rays can detect early lung cancer, such screening can also possibly produce many false-positive test results, causing needless extra tests.

At present, low-dose spiral computed tomography (LDCT) is of prime interest for screening (high risk) groups for early detection of lung cancer and is being studied by various groups, including the National Cancer Institute. LDCT provides chest scans with very high spatial, temporal, and contrast resolution of anatomic structures and is able to gather a complete 3D volume of a human thorax in a single breath-hold. Hence, for these reasons, in recent years most lung cancer screening programs are being investigated in the United States and Japan with LDCT as the screening modality of choice.

Automatic screening of image data from LDCT typically involves selecting initial candidate lung abnormalities (nodules). Next, the false candidates, called false positive nodules (FPNs), are partially eliminated while preserving the true ones (TPNs).

When selecting initial candidates, conformal nodule filtering or unsharp masking can enhance nodules and suppress other structures to separate the candidates from the background by simple thresholding or multiple gray-level thresholding techniques. A series of 3D cylindrical and spherical filters are used to detect small lung nodules from high resolution CT images. Circular and semicircular nodule candidates can be detected by template matching. However, these spherical, cylindrical, or circular assumptions are not adequate for describing general geometry of the lesions. This is because their shape can be irregular due to the speculation or the attachments to the pleural surface (i.e., juxtapleural and peripheral) and vessels (i.e., vascularized). Morphological operators may be used to detect lung nodules. The drawbacks to these approaches are the difficulties in detecting lung wall nodules. Also, there are other pattern recognition techniques used in detection of lung nodules such as clustering, linear discriminant functions, rule-based classification, Hough transforms, connected component analysis of thresholded CT slices, graylevel distance transforms, and patient-specific a priori models.

The FPNs may be excluded by feature extraction and classification. Such features as circularity, size, contrast, or local curvature that are extracted by morphological techniques, or artificial neural networks (ANN), can be used as post-classifiers. Also, there is a number of classification techniques used in the final stage of the nodule detection systems to reduce the FPNs such as: rule-based or linear classifiers; template matching; nearest cluster; and Markov random field.

Monitoring is a largely unresolved problem in lung scans, and there exist similar issues in monitoring other nodules or shaped targets. Nodules are at issue, for example, in other types of medical imaging analysis. Also shaped target monitoring has broader applications.

SUMMARY

The invention provides a fully automatic method for detection and monitoring, over time, nodules or other shaped targets from image data. Preferred embodiments relate to lung nodule detection, and those are used to illustrate the invention. However, artisans will also recognize that other types of nodules can be detected and monitored from the deformable, analytical template approach of the invention, for example in other medical and non-medical applications. Additionally, the invention has general application to shaped targets having analytical characteristics that can be detected and monitored from other types of image modalities and data.

Briefly, embodiments of the invention relate to a method for detecting a nodule, or other shaped target, in image data. Preferably, the method includes the steps of segmenting scanning information from an image slice to isolate lung tissue from other structures, resulting in segmented image data; extracting anatomic structures, including any potential nodules, from the segmented image data, resulting in extracted image data; and detecting possible nodules, or other shaped targets, from the extracted image data, based on deformable prototypes of candidates generated by a level set method in combination with a marginal gray level distribution method.

Embodiments of the invention also relate to an automatic method for detecting and monitoring nodules or other shaped targets in image data, where the method includes the comprising steps of determining adaptive probability models of visual appearance of small 2D and large 3D nodules or shaped targets to control the evolution of deformable models to get accurate segmentation of pulmonary nodules from image data; modeling a first set of nodules or shaped targets in image data with a translation and rotation invariant Markov-Gibbs random field (MGRF) of voxel intensities with pairwise interaction analytically identified from a set of training nodules; modeling a second subsequent set of nodules or shaped targets in image data by estimating a linear combination of discrete Gaussians; and integrating both models to guide the evolution of the deformable model to determine and monitor the boundary of each detected nodule or targeted shape in the image data.

BRIEF DESCRIPTION OF THE DRAWINGS

Preferred embodiments of the present invention are described herein with reference to the drawings wherein:

FIG. 1(A) shows an initial LDCT slice, FIG. 1(B) shows the separated lung regions, and FIG. 1(C) shows extracted objects in which a nodule candidate is encircled;

FIGS. 7(A)-7(C) show small candidate nodules (shown in the darker color) detected with the approach of an embodiment of the present invention, where FIG. 7(A) shows nodules of size 68.9 mm$^3$, FIG. 7(B) shows nodules of size 52.3 mm, and FIG. 7(C) shows nodules of size 34.8 mm$^3$;

FIG. 8(A) shows an LDCT slice, FIG. 8(B) shows the slice with isolated lungs, and FIG. 8(C) shows the normalized segmented lung image;

FIG. 10(A) is the 2D profile of the original nodule, FIG. 10(B) is the pixel-wise Gibbs energies (b) for $v \leq 11$, FIG. 10(C) is the segmentation of the present invention, and FIG. 10(D) is the radiologist's segmentation;

FIG. 11(A) is the 2D profile of the original nodule, FIG. 11(B) is the pixel-wise Gibbs energies for $v \leq 11$, FIG. 11(C) is the segmentation of the present invention, and FIG. 11(D) is the radiologist's segmentation.

DETAILED DESCRIPTION OF THE INVENTION

Figures 1A, 1B, 1C:
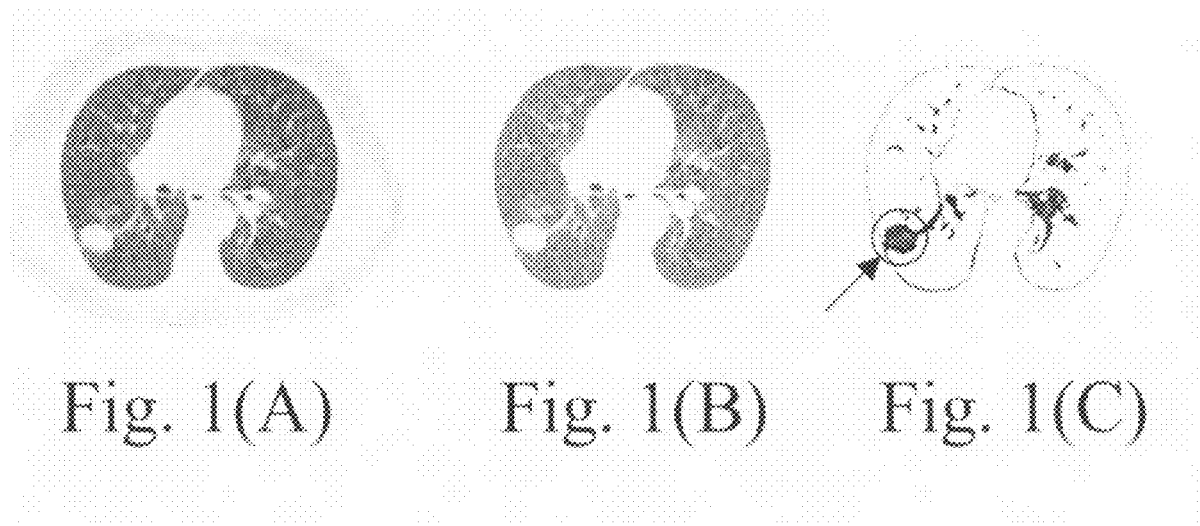
FIGS. 1(A)-1(C) show an example of the first two segmentation steps, where

Automatic diagnosis of lung nodules for early detection of lung cancer is the goal of a number of screening studies worldwide. With improvements in resolution and scanning time of low dose chest CT (computerized tomography) scanners, nodule detection and identification is continuously improving. The present invention relates to improvements in automatic detection of lung nodules. More specifically, preferred embodiments of invention employ a new template for nodule detection using level sets that describe various physical nodules irrespective of shape, size and distribution of gray levels. The template parameters are estimated automatically from the segmented data, without the need for any a priori learning of the parameters' density function, after performing preliminary steps of: (a) segmenting raw scanning information to isolate lung tissues from the rest of the structures in the lung cavity; and (b) extracting three dimensions (3D) anatomic structures (such as blood vessels, bronchioles, alveoli, etc., and possible abnormalities) from the already segmented lung tissues. Experiments show quantitatively that this template modeling approach drastically reduces the number of false positives in the nodule detection step (which follows the two preliminary steps above), thereby improving the overall accuracy of computer-aided diagnostic (CAD) systems. The impact of the new template model includes: 1) flexibility with respect to nodule topology, whereby various nodules can be detected simultaneously by the same technique; 2) automatic parameter estimation of the nodule models using the gray level information of the segmented data; and 3) the ability to provide an exhaustive search for all of the possible nodules in the scan, without excessive processing time, thereby providing enhanced accuracy of the CAD system without an increase in the overall diagnosis time.

Embodiments of the invention relates to the design of a diagnosis system, preferably employing a CAD (computer-aided diagnostic) system that will contribute to the early diagnosis of lung cancer. In one preferred embodiment, the invention uses helical low dose thin slice (2 mm-2.5 mm) chest CT scanning (LDCT), which provides very high spatial, temporal, and contrast resolution of anatomic structures. Of course other scanning methods are also contemplated as being within the scope of the invention. Automated detection of lung nodules in thoracic CT scans is an important clinical challenge, especially because manual analysis by a radiologist is time-consuming and may result in missed nodules.

Most of the CAD work in lung cancer screening involves two-stage detection of lung nodules, such that initial candidate nodules are first selected and then the false ones, called false positive nodules (FPNs), are partially eliminated while preserving the true positive nodules (TPNs). For example, conformal nodule filtering techniques and unsharp masking techniques both enhance nodules and suppress other structures at the first stage in order to separate the candidates from the background by simple thresholding. To improve the separation, the background trend is corrected within the image regions of interest. A series of three-dimensional (3D) cylindrical and spherical filters are then used to detect small lung nodules from high-resolution CT images. Next, circular nodule candidates are detected by template matching, or some other type of pattern recognition technique, such as fuzzy clustering, linear discriminant functions, rule-based classifications, or patient-specific a priori models. Also, cylindrical vascular models may be used along with spherical nodular models to amplify the template matching.

The FPNs are excluded at the second stage by feature extraction and classification whereby such features as circularity, size, contrast, or local curvature are extracted by morphological techniques. In addition, artificial neural networks (ANN) are frequently used as post-classifiers.

Referring now to FIGS. 1(A) through 1(C), a description will be provided of a preferred embodiment of the present CAD method and system for detecting the nodules in LDCT images. Basically, the system utilizes the following three main steps: Step (1) involves segmenting the raw scanning information from an initial LCDT slice, such as shown in FIG. 1(A), to isolate the lung tissues from the rest of the structures in the chest cavity, resulting in the separated lung regions, such as shown in FIG. 1(B); Step (2) involves extracting the three dimensional (3D) anatomic structures (such as blood vessels, bronchioles, alveoli, etc., and possible abnormalities, such as lung nodules, if present) from the already segmented lung tissues, resulting in an image such as shown in FIG. 1(C); and Step (3) involves identifying the nodules by isolating the true nodules from other extracted structures. The first two steps considerably reduce the search space by using segmentation algorithms based on representing each CT slice as a sample of a Markov-Gibbs random field of region labels and gray levels. Details of the algorithms are presented in Aly A. Farag, Ayman El-Baz, Georgy L. Gimel'farb, "Precise segmentation of multimodal images," *IEEE Transactions on Image Processing* Vol. 15, no. 4, April 2006, pp. 952-968, which is hereby incorporated by reference.

Figure 2:
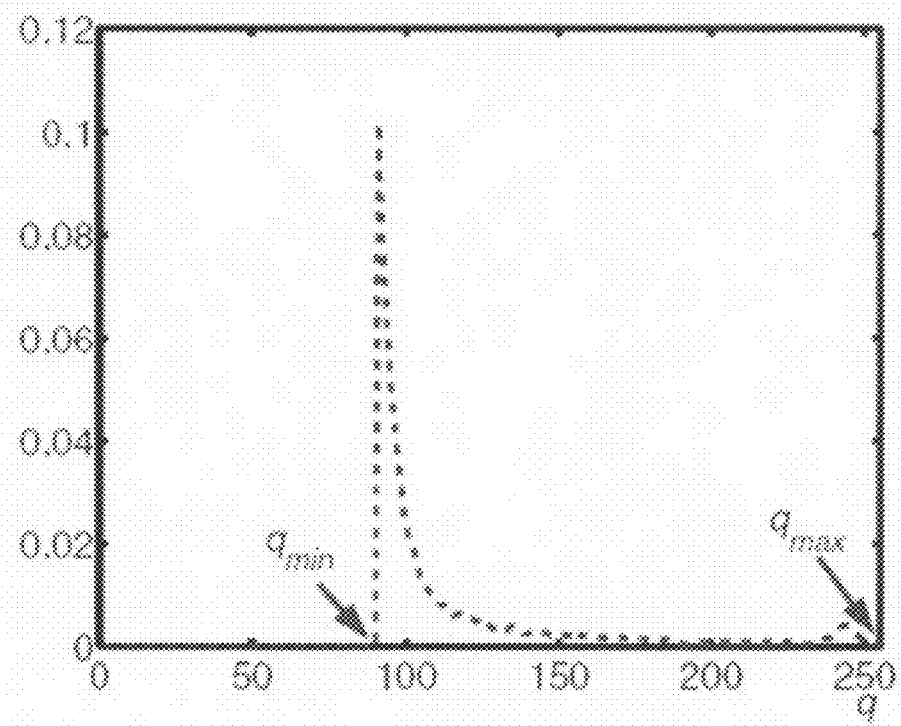
FIG. 2 shows an empirical marginal gray level distribution for the objects of FIG. 1(C), where the gray range is between 98 and 255.

Next, the details of the third step will be discussed, which step relates to detecting and classifying the nodules from among the extracted 3D structures. Both the nodules and normal objects have almost the same marginal gray level distributions, as can be seen in FIG. 2, which is the empirical marginal gray level distribution graph for all the extracted objects of FIG. 1(C). Therefore, segmentation of the nodules based solely on gray level distribution (such as thresholding) will not be sufficient. In the preferred embodiment, segmentation based on gray level distribution is supplemented by also including geometrical/shape information in the process. This approach includes a 3D deformable nodule prototype combined with a central-symmetric 3D intensity model of the nodules. The model closely approximates an empirical marginal probability distribution of image intensities in real nodules of different sizes, and nodules are analytically identified from the empirical distribution.

Detecting Lung Nodules with Deformable Prototypes

The detection step (Step (3)) extracts, by shape and intensities, and classifies the nodule candidates among all of the 3D objects selected at the second segmentation stage (Step (2)).

Deformable Prototype of a Candidate Nodule

In one preferred embodiment, to extract the nodule candidates from among the already selected objects, like those in FIG. 1(C), deformable prototypes generated by level sets, which have become a powerful segmentation tool in recent years, can be utilized. The evolving prototype's surface at time instant $t^o$ is a propagating zero-level front, $\phi(x, y, z, t^o)=0$, of a certain 4D scalar function $\phi(x, y, z, t)$ of 3D Cartesian co-ordinates $(x, y, z)$ and time $t$. Changes of $\phi$ in continuous time are given by the partial differential equation:

$$\frac{\partial \phi(x, y, z, t)}{\partial t} + F(x, y, z)|\nabla \phi(x, y, z, t)| = 0 \quad (1)$$

where $F(x, y, z)$ is a velocity function and $\nabla=[\partial/\partial x, \partial/\partial y, \partial/\partial z]^T$. The scalar velocity function controlling the front evolution depends on local geometric properties, e.g. a local curvature, $k(x, y, z)$, of the front, as well as on local input data parameters, e.g. a 3D gradient, $\nabla I(x, y, z)$, of the segmented 3D image I.

In practice, the difference relationship replaces Equation (1), and each next value $\phi(x, y, z, t_{n+1})$ relates to the current one $\phi(x, y, z, t_n)$ at respective time instants $t_{n+1}$ and $t_n$ such that $t_{n+1}-t_n=\Delta t$; $n=0, 1, \ldots$, as follows: $\phi(x, y, z, t_{n+1})=\phi(x, y, z, t_n)-\Delta t \cdot F(x, y, z)|\nabla \phi(x, y, z, t_n)|$.

The velocity function F plays a major role in the propagation process. Among known options for this function, this embodiment utilizes the following: $F(x, y, z)=-h(x, y, z)(1+\epsilon k(x, y, z))$, where $h(x, y, z)$ and $c$ are a local consistency term and a smoothing factor, respectively. Since the level set for a segmented 3D image I can always be initialized inside an object, an appropriate consistency term to evolve faster towards the object boundary can be as follows: $h(x, y, z)=(1+|\nabla I(x, y, z)|)^{-1}$. To keep the level set front from propagating through blood vessels to which the nodules may be connected, a lowpass filter is preferably applied after each propagation step n.

Figures 3A, 3B, 3C:
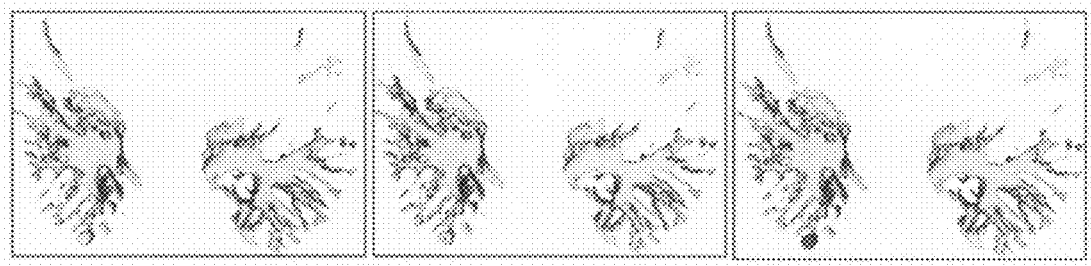
FIG. 3(A) shows part of the separated 3D lung objects.
FIG. 3(B) shows the initialized level set, indicated by darker color.
FIG. 3(C) shows the finally extracted potential nodule candidate.

FIGS. 3(A)-3(C) show an example of the results of extracting a potential nodule candidate with the deformable prototype, where FIG. 3(A) shows part of the separated 3D lung objects, FIG. 3(B) is the initialized level set, indicated by the darker spot toward the lower left corner of the figure, and FIG. 3(C) shows the finally extracted potential nodule candidate (toward the lower left corner of the figure). To check whether the extracted object is really a nodule candidate, measurements are preferably made of the similarity between grayscale patterns in the extracted part of the initial 3D image and the intensity prototype of the nodule of that shape, as described next.

Similarity Measure for Grayscale Nodule Prototypes

Analysis of abnormalities in real 3D LDCT slices suggests that gray levels in central cross-sections of a solid-shape 2D or 3D nodule roughly follow a central-symmetric Gaussian spatial pattern such that the large central intensity gradually decreases towards the boundary. Moreover, the marginal gray level distributions for all 3D objects separated from the lung tissues at the second segmentation stage (Step (2)), such as arteries, veins, bronchi, or nodules of different sizes, are very similar to each other. The 3D Gaussian intensity pattern in each grayscale nodule prototype ensures that the marginal gray level distribution closely approximates the empirical one for each real nodule in the LDCT data. The same approach can be followed in the 2D case (which is a special case from the 3D).

Assume that the prototype is a central-symmetric 3D Gaussian of radius R with the maximum intensity $q_{max}$ in the center so that the gray level $q(r)$ at any location $(x, y, z)$ at radius $r=(x^2+y^2+z^2)^{1/2}$ with respect to the center $(0,0,0)$ is given by the obvious relationship:

$$q(r)=q_{max} \exp(-(r/\rho)^2); \quad 0 \leq r \leq R \quad (2)$$

The scatter parameter $\rho$ in Equation (2) specifies how fast the signals will decrease towards the boundary of the prototype. The maximum gray level, $q_{max}=q(0)$, and the minimum gray level, $q_{min}=q(R)$, on the boundary of the spherical Gaussian prototype of radius R uniquely determine this parameter as follows:

$$\rho=R(\ln q_{max}-\ln q_{min})^{1/2} \quad (3)$$

Some earlier algorithms have failed to detect a large number of the true nodules, possibly because of their fixed-size templates and manual specification of their gray level patterns. See, e.g., the algorithm disclosed in Y. Lee, T. Hara, H. Fujita, S. Itoh, and T. Ishigaki, "Automated Detection of Pulmonary Nodules in Helical CT Images Based on an Improved Template-Matching Technique," IEEE Trans. on Medical Imaging, Vol. 20, pp. 595-604, 2001. At times these patterns change from one LDCT slice to another depending on the scanned cross-section and internal organs that appear in that cross-section. In the present algorithm, these patterns are analytically adjusted to each extracted shape by applying Equation (3) to each CT slice, thereby reducing the number true positive nodules that fail to be detected.

Because all of the points of the prototype with a fixed gray value q in the continuous interval $[q_{min}, q_{max}]$ are located at the spherical surface of radius $r(q)=\rho(\ln q_{max}-\ln q)^{1/2}$, their density is proportional to the surface area $4\pi r^2(q)$. Therefore, the marginal probability density function for such a prototype is $\psi(q)=\gamma r^2(q)$, where $\gamma$ is a normalizing factor such that $$\int_{q_{min}}^{q_{max}} \psi(q)dq = 1.$$

It is easily shown that this function has the following closed form:

$$\psi(q \mid q_{min}, q_{max}) = \frac{\ln q_{max} - \ln q}{q_{max} - q_{min}(1 + \ln q_{max} - \ln q_{min})} \quad (4)$$

The gray level parameters $q_{max}$ and $q_{min}$ can be estimated from the empirical marginal distribution for each segmented 3D object. For example, for the objects extracted in FIG. 1, the following estimations can be made from a review of FIG. 2: $q_{max}=255$ and $q_{min}=98$.

To evaluate similarity, the gray level nodule prototype is centered at the centroid of the volume extracted with the deformable prototype and then the similarity measure is calculated using normalized cross correlation (NCC). Details of examples of the algorithms that may be used are presented in A. A. Farag, A. El-Baz, G. Gimelfarb, R Falk, and S. G. Hushek, "Automatic detection and recognition of lung abnormalities in helical CT images using deformable templates," Lecture Notes in Computer Science, vol. 3217, pp. 131-139, September, 2004.

Lung Nodule Detection Algorithm

The following algorithm of a preferred embodiment of the invention explains how lung nodules can be detected from a CT scan.

Step S1. Separate the lung regions from a given CT scan using any appropriate segmentation algorithm, such as the one disclosed in Aly A. Farag, Ayman El-Baz, Georgy L. Gimel'farb, "Precise segmentation of multimodal images," IEEE Transactions on Image Processing Vol. 15, no. 4, April 2006, pp. 952-968, which is hereby incorporated by reference. The main idea of the proposed segmentation algorithm is based on accurate identification of both the spatial interaction between the lung voxels and the intensity distribution for the voxels in the lung tissues. The present inventors used new techniques for unsupervised segmentation of multi-modal grayscale images such that each region-of-interest relates to a single dominant mode of the empirical marginal probability distribution of gray levels. Embodiments of the present invention follow the most conventional description of the initial images and desired maps of regions, such as by using a joint Markov-Gibbs random field (MGRF) model of independent image signals and interdependent region labels, but with a focus on more accurate model identification. To better specify region borders, each empirical distribution of image signals is preferably precisely approximated by a linear combination of Gaussians (LCG) with positive and negative components. The present inventors modified the Expectation-Maximization (EM) algorithm to deal with the LCG and also exploit our novel EM-based sequential technique to get a close initial LCG-approximation to start with. The proposed technique identifies individual LCG-models in a mixed empirical distribution, including the number of positive and negative Gaussians. Then the initial LCG-based segmentation is iteratively refined using the MGRF with analytically estimated potentials. The analytical estimation is one of the key issues that makes the proposed segmentation accurate and fast and therefore suitable for clinical applications. FIG. 1(B) is an example of the resultant image of the separate lung regions.

Step S2. Separate the arteries, veins, bronchi, bronchioles, and lung nodules (if they exist) from the above lung regions of Step S1 using any appropriate segmentation algorithm, such as the one mentioned in Step S1. FIG. 1(C) is an example of the resultant image including the separated arteries, veins, bronchi, and bronchioles, as well as a lung nodule candidate, which has been encircled.

Step S3. From the empirical marginal gray level distribution for the objects separated at Step S2, calculate $q_{min}$ and $q_{max}$. FIG. 2 is an example of such an empirical marginal gray level distribution for all of the extracted objects of FIG. 1(C).

Step S4. Stack all of the voxels separated in Step S2.

Step S5. Pop-up the top voxel from the stack as a seed for the deformable prototype, and let this level set propagate until reaching a steady-state, indicating that the voxel set U enclosed by the final prototype constitutes an extracted object.

Step S6. Calculate the centroid for the voxel set U extracted in Step S5. Next, find the maximum radius, $R_{max}$, and the minimum radius, $R_{min}$, from the centroid of the boundary of that voxel set. Then, find the average radius using the equation $R=(R_{min}+R_{max})/2$. Finally, estimate the scatter parameter p from Equation (3).

Step S7. Use Equation (2) to assign the prototype gray levels $N_{x,y,z}$ for each extracted voxel $(x, y, z) \in U$.

Figure 4:
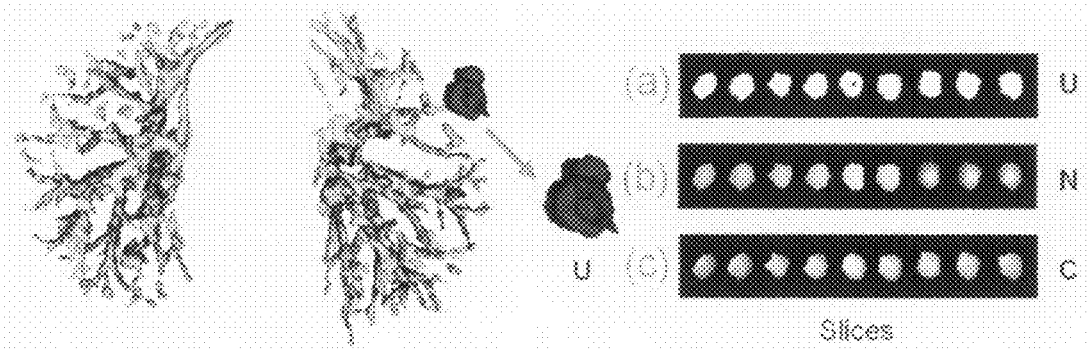
FIG. 4 shows the detected nodule candidate where: (a) shows slices of the extracted voxel set U; (b) shows the gray level prototype N; and (c) shows the actual gray levels C, where the correlation $Corr_{C,N}$=0.886.

Step S8. Use the normalized cross-correlation $Corr_{C,N}$ between the actual extracted object $C=[C_{x,y,z}:(x, y, z) \in U]$ and its gray level nodule prototype $N=[N_{x,y,z}:(x, y, z) \in U]$ as the similarity measure. FIG. 4 shows an example of the detected nodule candidate, where (a) shows the slices of the extracted voxel set U, (b) shows the gray level prototype N, and (c) shows the actual gray levels C. In this example, $Corr_{C,N}=0.886$.

Step S9. If $Corr_{C,N} \geq \tau$, where $\tau$ is a pre-selected similarity threshold, then classify the extracted object as a potential nodule candidate. By way of example, $\tau$ may be selected within the range 0f 0.80 to 0.90, such as $\tau=0.85$.

Step S10. Remove all of the voxels of the extracted object from the stack.

Step S11. If the stack is empty, then stop, otherwise go to Step S5 and repeat the process from Step S5 onward.

To reduce the error rate, the initially selected potential candidates are preferably post-classified to distinguish between the false positive nodules (FPNs) and true positive nodules (TPNs). In one embodiment, such post classification can be performed using the textural and geometric features of each detected nodule, such as using the following three features: (i) the radial non-uniformity of its borders $$U = \max_{\theta}(d)(\theta)) - \min_{\theta}(d)(\theta))$$

(where $d(\theta)$ is the distance at the angle $\theta$ between the center of the template and the border of the segmented object in FIG. 1(C)); (ii) the mean gray level ($q_{ave}$) over the 3D or 2D nodular template; and (iii) the 10%-tile gray level for the marginal gray level distribution over the 3D or 2D nodular template. To distinguish between the FPNs and the TPNs, one can use the Bayesian supervised classifier learning statistical characteristics of these features from a training set of false and true nodules. All three features [(i)-(iii)] can be used to classify the FPNs within the lung, while only the last two features [(ii) and (iii)] can be applied to the lung wall nodules.

A. A. Farag, A. El-Baz, G. Gimel'farb, R. Falk, and S. G. Hushek, "Automatic detection and recognition of lung abnormalities in helical CT images using deformable templates," Proc. MICCAI, Saint-Malo, France, Sep. 26-29, 2004, pp. 856-864, 2004, which is hereby incorporated by reference, provides more details of this process.

Figure 5A:
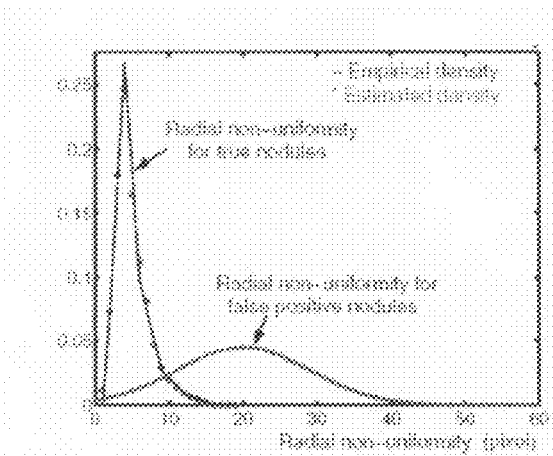
FIGS. 5(A)-5(C) show the estimated and empirical distributions for radial non-uniformity (FIG. 5(A)); mean gray level (FIG. 5(B)); and 10%-tile gray level (FIG. 5(C))
Figure 5B:
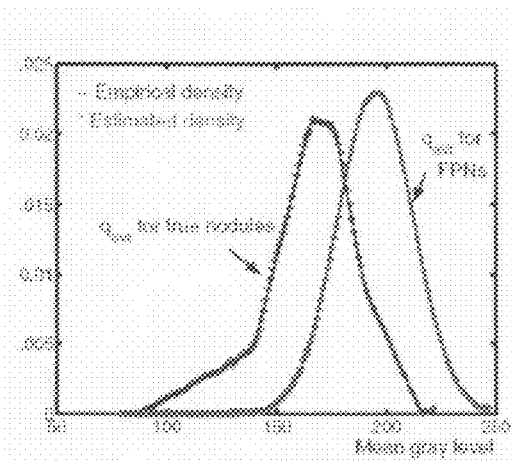
Figure 5C:
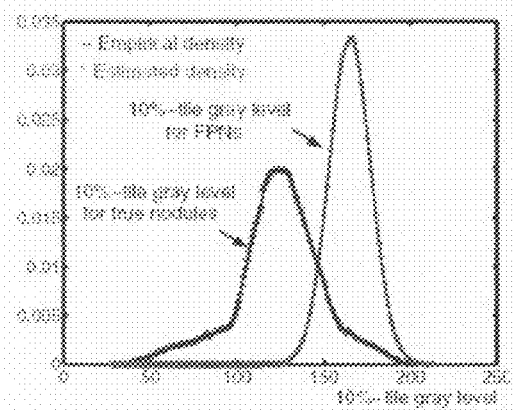
Figure 5D:
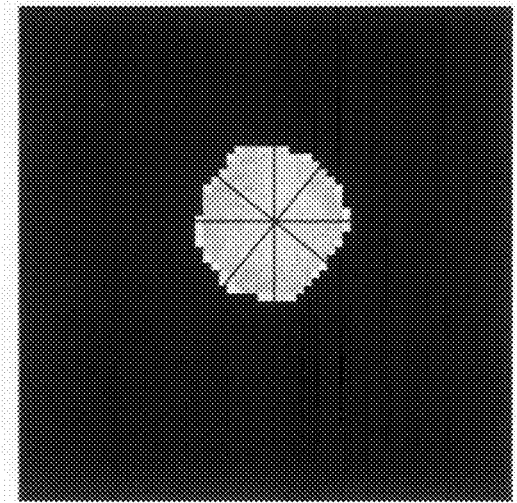
FIG. 5(D) shows the radii $d_\theta$ in eight directions $\theta$ from the centroid to the boundary that specifies the radial non-uniformity $\max_\theta(d_\theta)-\min_\theta(d_\theta)$.

As an alternate method of post-classification, the probability distributions of each feature required by the classifier can be accurately estimated with linear combinations of Gaussians (LCGs) using the algorithms such as those described in Aly A. Farag, Ayman El-Baz, Georgy L. Gimel'farb, "Precise segmentation of multimodal images," *IEEE Transactions on Image Processing*, Vol. 15, no. 4, Apr. 2006, pp. 952-968, which is hereby incorporated by reference. Briefly, in the LCG method, the LCGs approximate the empirical distributions for a training set of the nodules. FIG. 5(A)-5(C) show the empirical and estimated distributions of each feature for both TPNs and FPNs for the candidate shape of FIG. 5(D) for the radii $d_\theta$ in eight directions from the centroid to the boundary that specify the radial non-uniformity $\max_\theta(d_\theta) - \min_\theta(d_\theta)$. FIG. 5(A) relates to radial non-uniformity; FIG. 5(B) relates to the mean gray level; and FIG. 5(C) relates to the 10%-tile gray level. It is also contemplated that other post-classification methods could also be utilized.

Experimental Results and Conclusions of Previously Described Embodiments

The lung and nodule detection algorithm described above has been tested on the same LDCT scans of fifty screened subjects. Among them, sixteen subjects had abnormalities in their CT scans and thirty-four subjects were normal (this classification was validated by two radiologists). The chest CT data used in this paper were obtained from Mansoura University, Urology and Nephrology Center, Radiology Department, Mansoura, Egypt using the following: (1) The scanner: Multidetecor scanner (Light speed plus; GE), (2) Scan mode: Helical, (3) Slice thickness: 2.5 mm, (4) Field of view: large, (5) K. V.: 120, (6) M. A.: 200, (7) Exposure time: 20-25 sec., and (8) Window level: −500 & length 1500. Of course, the parameters of these tests are only examples, and other types of scanners set with other parameters could be used.

Figure 6:
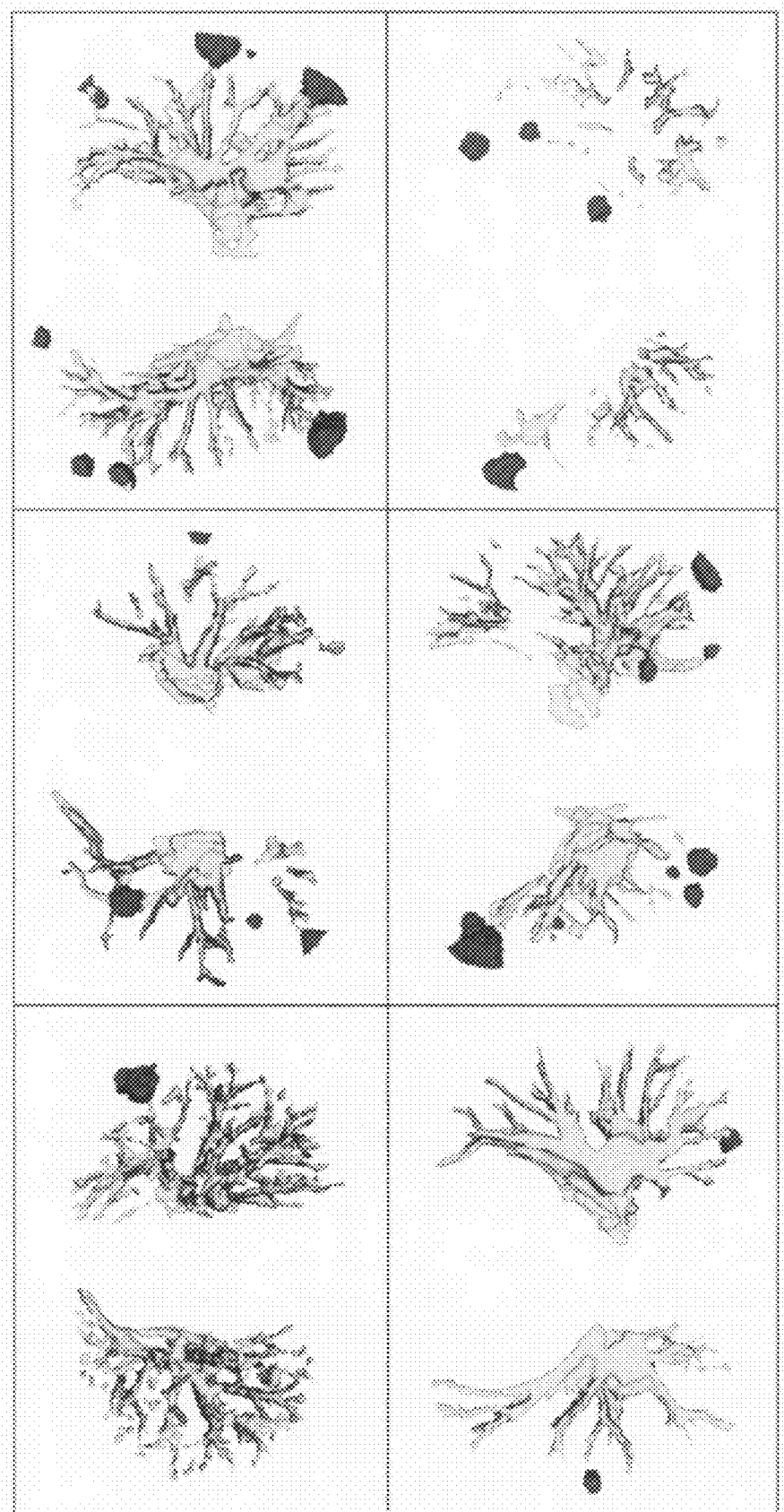
FIG. 6 shows large candidate nodules (shown in the darker color) detected with the approach of an embodiment of the present invention.

The approach using the lung nodule detection algorithm described above extracted one hundred and thirteen (113) potential nodule candidates out of the true one hundred and nineteen (119) nodules and fourteen (14) FPNs. Post-classification reduced the number of FPNs to four (4), but also simultaneously rejected two (2) true nodules (TPN). Thus, the final detection rate of the TPNs was 93.3% (111 out of 119) with an FPNs rate of 3.36%, which is a vast improvement over the results of a final detection rate of the TPNs of 82.3% and an FPNs rate of 9.2% from the earlier algorithm disclosed in G. Gimel'farb, A. A. Farag, and A. El-Baz, "Expectation-Maximization for a Linear Combination of Gaussians," in Proc. IAPR Int. Conf. Pattern Recognition (ICPR 2004), Cambridge, UK, Aug. 23-26, 2004, vol. 2, pp. 422-425, 2004. FIG. 6 shows examples of several large lung nodules (shown darkened) with the lung nodule detection algorithm described above, and FIG. 7 shows examples of a few, small, detected TPNs (shown darkened).

Our experiments show that the new deformable level-set prototype with the analytically modeled standard intensity pattern detects more than 90% of the true lung abnormalities. In our experiments, the overall processing time for the data set of size 1005×804×186 was six minutes, which is a vast improvement over previous algorithms that could take between fifteen and twenty minutes of processing time, using the same type of computer.

Variation of Second Segmentation Stage

Next, a discussion of a variation on the second segmentation stage, Step (2), will be provided. In this variation, the focus is on accurate segmentation of the detected nodules for subsequent volumetric measurements to monitor how the nodules change over time.

Figures 8A, 8B, 8C:
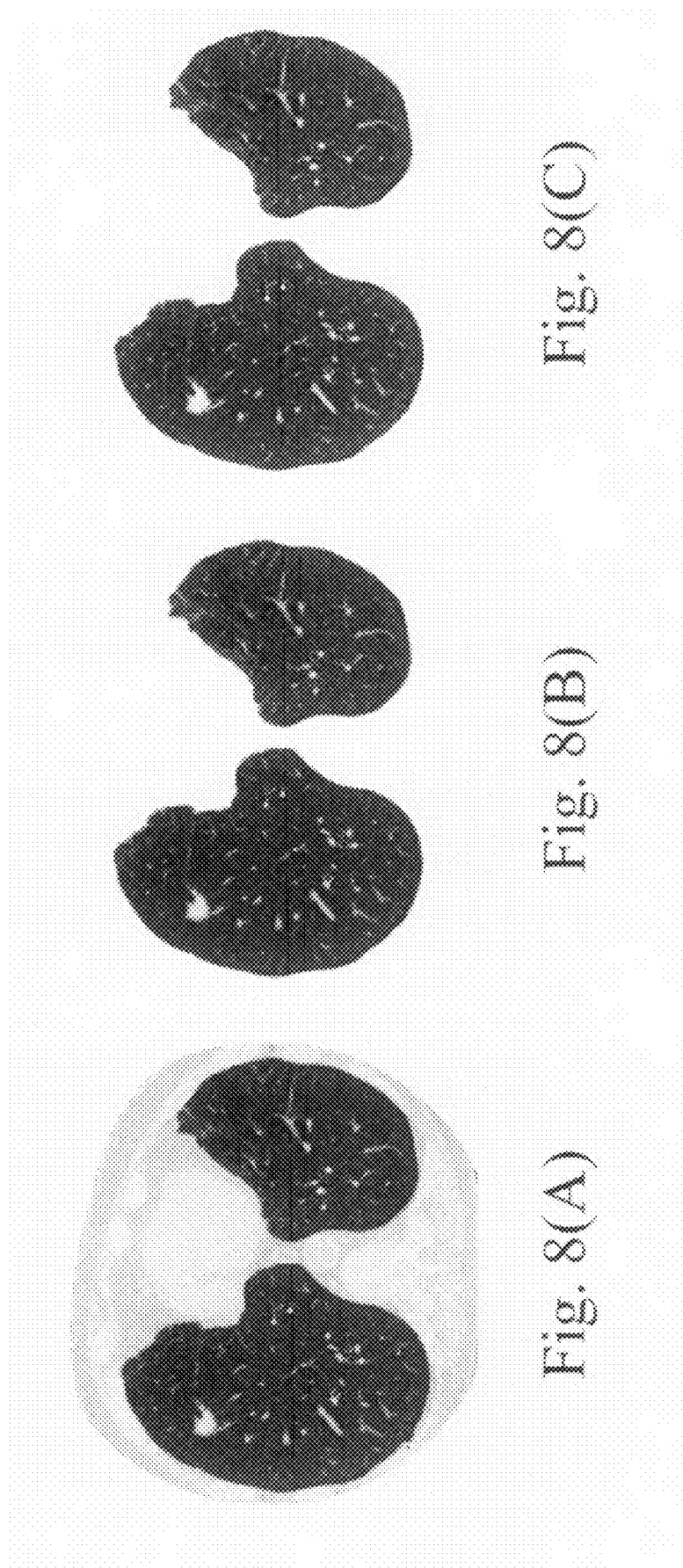
FIGS. 8(A)-8(C) show step 1 of the present segmentation approach where

In this variation, the first portion of the process of separating the nodules from their background can be the same as described above for the other method—segmenting an initial LDCT slice with algorithms described above to isolate lung tissues from surrounding structures in the chest cavity, such as shown in FIG. 8(A). However, in the second portion of the process of separating the nodules from their background, which is different from that described above, the nodules in the isolated lung regions are segmented by evolving deformable boundaries under forces that depend on the learned current and prior appearance models.

As in the other method described previously, in Step (1), each LDCT slice is modeled as a bi-modal sample from a simple Markov-Gibbs random field (MGRF) of interdependent region labels and conditionally independent voxel intensities (gray levels). This step provides for more accurate separation of nodules from the lung tissues at Step (2) because voxels of both the nodules and other chest structures around the lungs are normally of quite similar intensity. Then, in Step (2), this variation uses deformable boundary models, such that their evolution is controlled by both: (i) a learned prior probability model of the visual nodule appearance, such as an MGRF-based prior appearance model; and (ii) an adaptive appearance model of the nodules in a current image to be segmented, such as an LCDG-based (liner combination of discrete Gaussians) appearance model.

In this portion of the specification, the following basic notation is utilized. Let $(x, y, z)$ denote Cartesian coordinates of points in a finite arithmetic lattice $R=[(x, y, z):x=0, \ldots, X-1; y, \ldots, Y-1; z, \ldots, Z-1]$. This lattice supports a given 3D grayscale image $g=[g_{x,y,z}:(x, y, z)\in R; g_{x,y,z}\in Q]$ with gray levels from a finite set $Q=\{0, \ldots, Q-1\}$ and its region map $m=[m_{x,y,z}:(x, y, z)\in R; m_{x,y,z}\in L]$ with region labels from a finite set $L=\{nd, bg\}$. Each label $m_{x,y,z}$ indicates whether the pixel $(x, y, z)$ in the corresponding data set g belongs to the goal object (pulmonary nodule), $m_{x,y,z}=nd$, or to the background, $m_{x,y,z}=bg$. Let $b=[P_k:k=1, \ldots, K]$ be a deformable piecewise-linear boundary with K control points $P_k=(x_k, y_k, z_k)$. The index k can be considered as a real number in the interval K indicating continuous positions around the boundary, such as $K=[1, K]$ for the positions from $P_1$ to $P_K$.

The conventional deformable model moves in the direction that minimizes a boundary energy E:

$$E=E_{int}+E_{ext}=\int_{k\in K}(\xi_{int}(b(P_k))+\xi_{ext}(b(P_k)))dk \quad (5)$$

where $\xi_{int}(b(P_k))$ and $\xi_{ext}(b(P_k))$ are internal and external forces, respectively. As described below, this variation includes a new class of the external energy that guided the evolution of deformable model based on two new probability models that roughly describe the prior and current visual appearance of the nodules.

Data Normalization

To account for monotone (order-preserving) changes of signals (e.g. due to different illumination or sensor characteristics), for each segmented data set, we will calculate the occurrence histogram, then we normalize the segmented data set to make $q_{max}=255$ for each segmented data set, such as shown in the example of FIG. 8(C).

MGRF-Based Prior Appearance Model

To exclude an alignment stage before segmentation, the appearance of both small, 2D and large, 3D nodules (or other shaped targets) is modeled with a translation and rotation invariant generic MGRF (Markov-Gibbs Random Field) with voxel-wise and central-symmetric pairwise voxel interaction specified by a set N of characteristic central-symmetric voxel neighborhoods $\{n_v : v \in N\}$ on R and a corresponding set V of Gibbs potentials, with one potential per neighborhood.

Figure 9A:
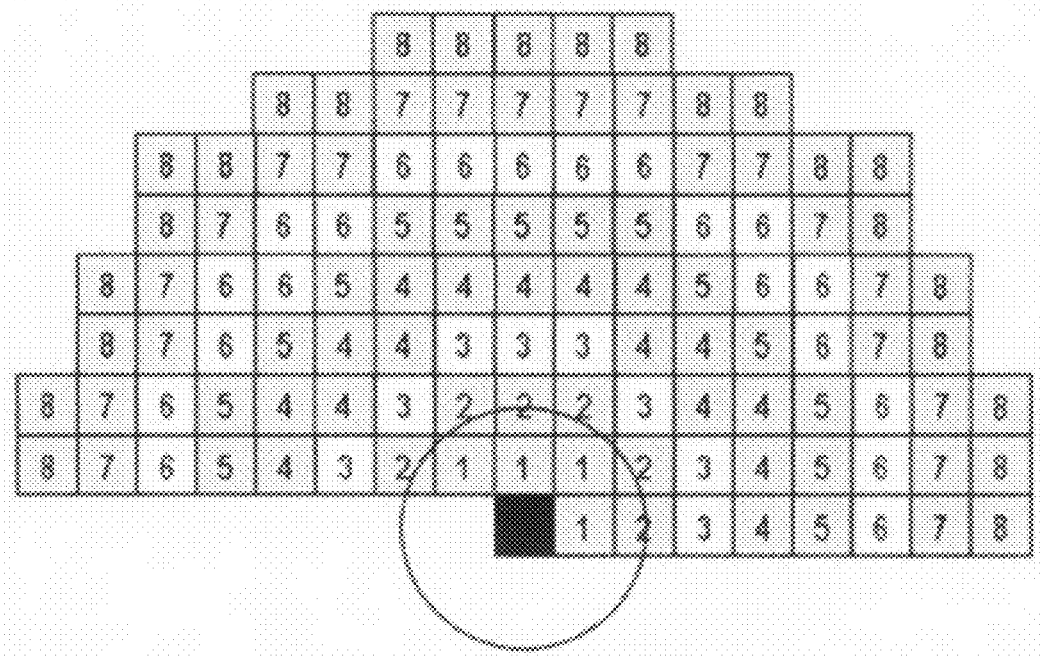
FIG. 9(A) and FIG. 9(B) show, respectively, the central-symmetric 2D and 3(D) neighborhoods for the eight distance ranges $[d_{v,min}=v-0.5, d_{v,max}=v+0.5)$; $v \in N=\{1, \ldots, 8\}$ on the lattice R.
Figure 9B:
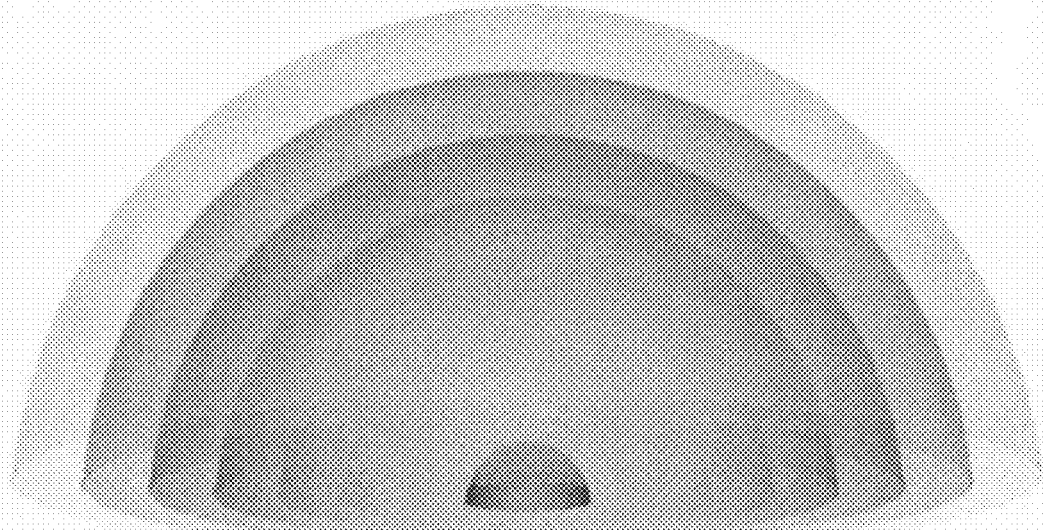

A central-symmetric voxel neighborhood $n_v$ embraces all voxel pairs such that (x, y, z)-coordinate offsets between a voxel (x, y, z) and its neighbor (x', y', z') belong to an indexed semi-open interval $[d_{v,min}, d_{v,max})$; $v \in N \subset \{1, 2, 3, \ldots\}$ of the inter-voxel distances: $d_{v,min} \leq \sqrt{(x-x')^2+(y-y')^2+(z-z')^2} < d_{v,max}$. FIGS. 9(A) and 9(B) illustrate the neighborhoods $n_v$ for the uniform distance ranges $[v-0.5, v+0.5)$; $v \in N = \{1, \ldots, 8\}$.

The interactions in each neighborhood nV have the same Gibbs potential function $V_v$ of gray level co-occurrences in the neighboring voxel pairs, and the voxel-wise interaction is given with the potential function $V_{vox}$ of gray levels in the voxels:

$$V = [V_{vox} = [V_{vox}(q) : q \in Q]; \{V_v = V_v(q,q') : (q,q') \in Q^2\} : v \in N\}]$$

Model Identification

Let $R_t = \{(x, y, z) : (x, y, z) \in R \wedge m_{t;x,y,z} = nd\}$ and $C_{v,t}$ denote the part of the 3D lattice R supporting the training nodules in the image-map pair $(g_t, m_t) \in S$ and the family of voxel pairs in $R_t^2$ with the co-ordinate offsets $(\xi, \eta, \gamma) \in n_v$, respectively. Let $F_{vox,t}$ and $F_{v,t}$ be a joint empirical probability distribution of gray levels and of gray level co-occurrences in the training nodules from the image $g_t$, respectively:

$$F_{vox,t} = \left[ f_{vox,t}(q) = \frac{|R_{t,q}|}{|R_t|}; \sum_{q \in Q} f_{vox,t}(q) = 1 \right]$$

and $$F_{v,t} = \left( f_{v,t}(q, q') = \frac{|C_{v,t,q,q'}|}{|C_{v,t}|} ; \right.$$

$\Sigma_{(q,q') \in Q^2} f_{v,t}(q,q') = 1$] where $R_{t,q} = \{x,y,z) : (x,y,z) \in R_t \wedge g_{x,y,z} = q\}$ is a subset of voxels supporting the gray level q in the training nodules from the images $g_t$ and $C_{v,t,q,q'}$ is a subfamily of the voxel pairs $c_{\xi,\eta\gamma}(x, y, z) = ((x, y, z), (x+\xi \cdot y+\eta, z+\gamma)) \in R_t^2$ supporting the gray level co-occurrence (q,q') in the same nodules, respectively.

The MGRF model of the t-th object is specified by the joint Gibbs probability distribution on the sublattice $R_t$:

$$P_t = \frac{1}{Z_t} \exp \left( |R_t| \left( V_{vox}^T F_{vox,t} + \sum_{v \in N} \rho v t V_{v,t}^T F_{v,t} \right) \right) \quad (6)$$

where $\rho_{v,t} = |C_{v,t}|/|R_t|$ is the average cardinality of the neighborhood $n_v$ with respect to the sublattice $R_t$.

To simplify notation, let areas of the training nodules be similar, so that $|R_t| \approx R_{nd}$ and $|C_{v,t}| \approx C_{v,nd}$ for t=1, ..., T, where $R_{nd}$ and $C_{v,nd}$ are the average cardinalities over the training set S. Assuming the independent samples, the joint probability distribution of gray values for all the training nodules is as follows:

$$P_S = \frac{1}{Z} \exp \left( T R_{nd} \left( V_{vox}^T F_{vox} + \sum_{v \in N} \rho_v V_v^T F_v \right) \right)$$

where $\rho_v = C_{v,nd}/R_{nd}$, and the marginal empirical distributions of gray levels $F_{vox,nd}$ and gray level co-occurrences $F_{v,nd}$ describe now all the nodules from the training set. Zero empirical probabilities caused by a relatively small volume of the training data available to identify the above model are eliminated if fractions defining the empirical probabilities in terms of cardinalities of the related sublattices or subfamilies are modified as follows: (<nominator>+$\epsilon$)/(<denominator>+$S\epsilon$). With the Bayesian quadratic loss estimate, $\epsilon=1$ and $S=Q$ for the first-order or $S=Q^2$ for the second-order interactions.

Using the analytical approach similar to that in A. A. Farag, A. El-Baz, and G. Gimel'farb, "Precise Segmentation of Multi-modal Images," IEEE Transactions on Image Processing, vol. 15, no. 4, pp. 952-968, April 2006, the potentials are approximated with the scaled centered empirical probabilities:

$$V_{vox,nd}(q) = \lambda \left( f_{vox,nd}(q) - \frac{1}{Q} \right); (q) \in Q; \quad (7)$$

$$V_{v,nd}(q, q') = \lambda \left( f_{v,nd}(q, q') - \frac{1}{Q^2} \right); (q, q') \in Q^2; v \in N$$

where the common factor $\lambda$ is also computed analytically. It can be omitted ($\lambda=1$) if only relative potential values are used for computing relative energies $E_{v,rel}$ of the central-symmetric pairwise voxel interactions in the training data. The energies that are equal to the variances of the co-occurrence distributions:

$$E_{v,rel} = \sum_{q,q' \in Q^2} f_{v,nd}(q, q') \left( f_{v,nd}(q, q') - \frac{1}{Q^2} \right)$$

allow for ranking all the central-symmetric neighborhoods $n_v$ and selecting the top-rank, i.e. most characteristic ones $N' \subset N$ to include to the prior appearance model of Equation (7). Under the model, any grayscale pattern within a deformable boundary b in an image g is described by its Gibbs energy $$E(g, b) = V_{xox,nd}^T F_{xox,nd}(g; b) + \sum_{v \in N'} V_{v,nd}^T F_{v,nd}(g, b) \quad (8)$$

where N' is an index subset of the selected top-rank neighborhoods, and the empirical probability distributions are collected within the boundary b in g.

LCDG-Based Current Appearance Model

The visual appearance of nodules in each current data set g to be segmented typically differ from the appearance of the training nodules due to non-linear intensity variations from different data acquisition systems and changes in patient tissue characteristics, radiation dose, scanner type, and scanning parameters. This is why, in addition to the appearance prior learned from the normalized training nodules, we model the marginal gray level distribution within an evolving boundary b in g with a dynamic mixture of two distributions for current candidates for nodules and their background, respectively. The mixture is closely approximated with a bi-modal linear combination of discrete Gaussians (LCDG) and then partitioned into the nodule and background LCDGs. The approximation is preferably performed with a modified EM-based approach, such as described in A. A. Farag, A. El-Baz, and G. Gimel'farb, "Precise Segmentation of Multi-modal Images," IEEE Transactions on Image Processing, vol. 15, no. 4, pp. 952-968, April 2006.

Boundary Evolution Using Two Appearance Models

The following external energy term in Equation (5) combines the learned prior and current appearance models to guide an evolving boundary in a way such that maximizes the energy within the boundary:

$$\xi_{ext}(b(P_k=(x,y,z)))=-p_{vox,nd}(g_{x,y,z})\pi_p(g_{x,y,z}|S) \quad (9)$$

where $P_{vox,nd}(q)$ is the marginal probability of the gray level q in the LCDG model for the nodules, arteries, and veins and $\pi_p(q|S)$ is the prior conditional probability of the gray level q, given the current gray values in the characteristic central-symmetric neighborhoods of $P_k$, for the MGRF prior model:

$$\pi_P(g_{x,y,z}|S) = \frac{\exp(E\rho(g_{x,y,z}|S))}{\sum_{q \in Q} \exp(E\rho(q|S))}$$

where $E_P(q|S)$ is the voxel-wise Gibbs energy for a gray level q assigned to P and the current fixed gray levels in all neighbors of P in the characteristic neighborhoods $n_v$; $v \in N$:

$$E_p(q|S) = V_{vox,nd}(q) + \sum_{v \in N} \sum_{(\xi,\eta,y) \in nv} (V_{n,nd}(g_{x-\varepsilon,y-\eta,z-\gamma},q) + V_{v,nd}(q, g_{x+\xi,y+n,z+\gamma}))$$

The boundary evolution in each 2D section with the fixed z-coordinate terminates after the total energy $E_r$ of the region $r \subset R$ inside the boundary b does not change:

$$E_r = \sum_{\forall P=(x,y,z) \in r} E_P(g_{x,y,z}|S) \quad (10)$$

The deformable boundary b evolves in discrete time, $\tau=0, 1, \ldots, T$, as follows:

1. Initialization ($\tau=0$):

(a) Initialize a boundary inside a nodule. For example, this step may be performed automatically, as described in such as described in A. A. Farag, A. El-Baz, and G. Gimel'farb, "Precise Segmentation of Multi-modal Images," IEEE Transactions on Image Processing, vol. 15, no. 4, pp. 952-968, April 2006.

(b) Using voxels within and outside of the initial boundary, estimate the current "nodule" and "background" LCDGs $P_{vox,nd}$ and $P_{vox,bg}$.

2. Evolution ($\tau \leftarrow \tau+1$):

(a) Calculate the total energy of Equation (10) within the current boundary $b_\tau$.

(b) For each control point $P_k$ on the current boundary, indicate the exterior (−) and interior (+) nearest neighbors with respect to the boundary.

(c) For each (+) point, calculate the total energy of Equation (5) for each new candidate for the current control point.

(d) Select the minimum-energy new candidate.

(e) Calculate the total energy of Equation (10) within the boundary that could have appeared if the current control point has been moved to the selected candidate position.

(f) If the total energy increases, accept this new position of the current control point, otherwise for each (−) point, calculate the total energy of Equation (5) for each new candidate for the current control point.

(g) Select the minimum-energy new candidate.

(h) Calculate the total energy of Equation (10) within the boundary that could have appeared if the current control point has been moved to the selected candidate position.

(i) If the total energy increases, accept this new position of the current control point.

(j) Otherwise, do not move the current control point because it is already located on the edge of the desired nodule.

(k) Mark each voxel visited by the deformable boundary.

(l) If the current control point moves to the voxel visited earlier, then find the edge formed by the already visited voxels and use the edge points as the new control points of the deformable boundary.

(m) If the new control points appear, interpolate the whole boundary using cubic splines, and then smooth its control points with a low pass filter.

(n) If the total energy within the boundary does not change, terminate the process; otherwise return to Step 2b.

Experimental Results and Conclusions with Regard to the Variation

The proposed segmentation algorithm of the variation was tested on a database of clinical multislice 3D chest LDCT scans of twenty-nine patients with 0.7×0.7×2.5 mm³ voxels that contain 350 nodules. More specifically, the database included 150 solid nodules of larger than 5 mm in diameter, 40 small solid nodules of less than 5 mm diameter, 10 cavity nodules, 61 nodules attached to the pleural surface, and 89 largely non-spherical nodules. The diameters of the nodules range from 3 mm to 30 mm.

Figure 10A:
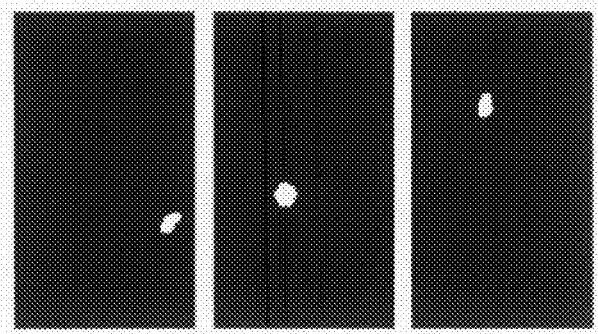
FIGS. 10(A)-10(D) show 3D segmentation of pleural attached nodules; where the results are projected onto 2D axial (A), coronal (C), and saggital (S) p-lanes for visualization, where
Figure 10B:
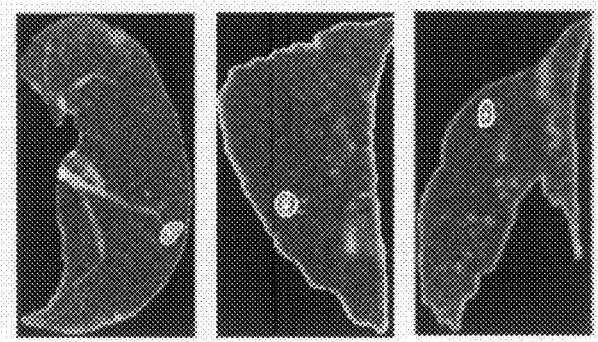
Figure 10C:
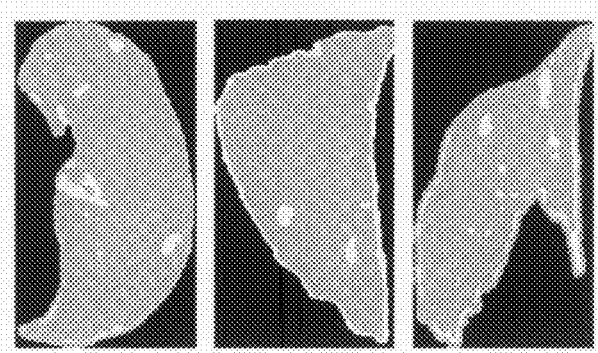
Figure 10D:
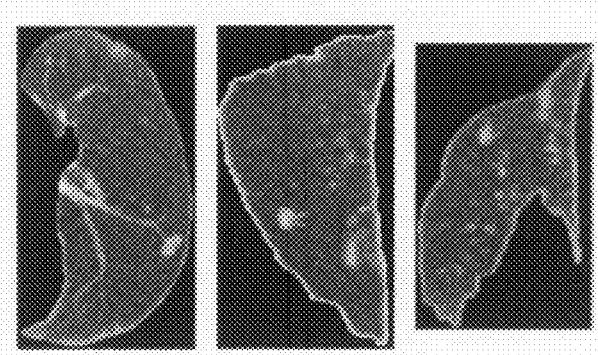

FIGS. 10(A)-10(D) illustrate the results of 3D segmenting of pleural attached nodules shown projected onto axial (A), sagittal (S), and coronal (C) planes for visualization. More specifically, FIG. 10(A) shows the (A), (S) and (C) planes of the original profile; FIG. 10(B) shows the (A), (S) and (C) planes for pixel-wise Gibbs energies for vv≦11; FIG. 10(C) shows the (A), (S) and (C) planes for the variation segmentation of the present invention; and FIG. 10(D) shows the (A), (S) and (C) planes of the radiologist's segmentation.

The pixel-wise Gibbs energies in each cross-section are higher for the nodules than for any other lung voxels, including the attached artery. Therefore, this variation accurately separates the pulmonary nodules from any part of the attached artery. The evolution terminates after fifty iterations because the changes in the total energy become close to zero. The error of this type of segmentation of the present invention with respect to the radiologist "ground truth" is 1.86%.

Figure 11A:
FIGS. 11(A)-11(D) show 2D segmentation of cavity nodules, where
Figure 11B:
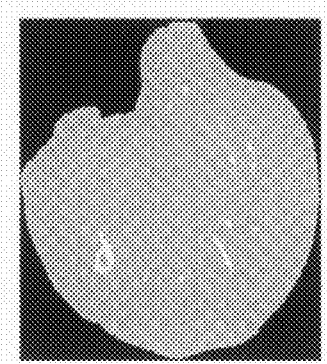
Figure 11C:
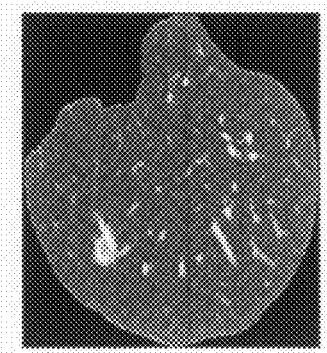
Figure 11D:
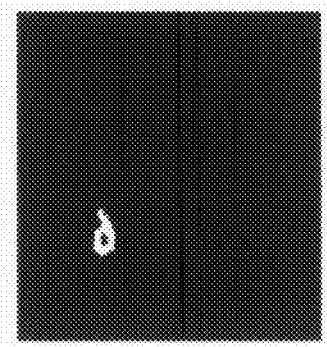

One of the main advantages of this variation over other algorithms is in the more accurate segmentation of thin cavity nodules, i.e. the nodules that appear only in a single slice. For example, FIGS. 11(A)-11(D) are 2D segmentations of such thin cavity nodules, where FIG. 11(A) is a 2D profile of the original nodule; FIG. 11(B) is of the pixel-wise Gibbs energies for v≦11; FIG. 11(C) is of the variation segmentation of the present invention; and FIG. 11(D) is the radiologist's segmentation.

Experimental results of FIGS. 11(A)-11(D) show that the error of this variation of the segmentation step of the present invention with respect to the radiologist is 2.1%. It is worthy to note that all the existing approaches fail to segment this cavity nodule because it is totally inhomogeneous.

Figure 12:
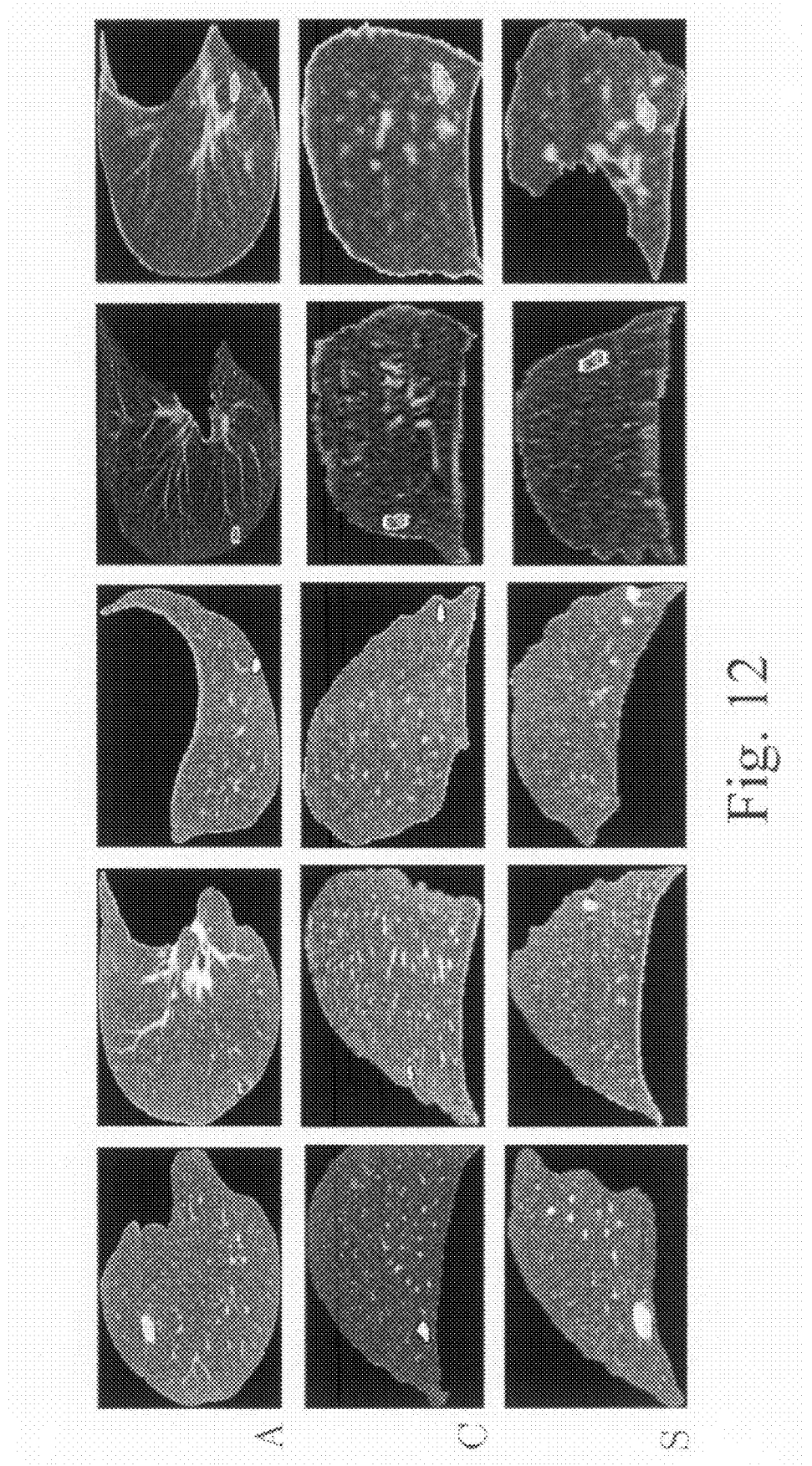
FIG. 12 shows the segmentation of the present invention for five patients.

FIG. 12 presents more segmentation results obtained by the variation algorithm of the present invention for five more patients, for each of the axial (A), sagittal (S), and coronal (C) planes. In total, our experiments with the segmentation of the 350 nodules resulted in an error range of between 0.4%-2.35%, with a mean error of 0.96%, and a standard error deviation of 1.1%.

This type of segmentation of the present invention provides a new method to accurately segment small 2D and large 3D pulmonary nodules on LDCT chest images. With this approach, the evolution of a deformable model is controlled with probability models of visual appearance of pulmonary nodules. The prior MGRF model is identified from a given training set of nodules. The current appearance model adapts the control to each bi-modal image of the lung regions to be segmented. Both of the models are learned using simple analytical and numerical techniques. Experiments with real LDCT chest images confirm the high accuracy of the segmentation method of the present invention with respect to the radiologist's ground truth. Further, the segmentation of this portion of the present invention outperforms other existing approaches for all types of nodules, and in particular, for cavity nodules where other existing approaches fail.

CONCLUSION

Thus, it has been showns that methods and/or systems of the invention detect the nodules in LCDT data. In addition, nodules identified in initial data can be monitored in subsequently obtained data from the same subject, permitting, for example, the identification of nodules that have grown. In embodiments of the invention, raw scanning image data is segmented to isolate lung tissues from the rest of the structures in the chest cavity. Three dimensional (3D) anatomic structures (e.g., blood vessels, bronchioles, alveoli, etc., and possible abnormalities) are then extracted from the segmented lung tissues. Nodules are identified by isolating the true nodules from other extracted structures.

Embodiments of the invention use a 3D deformable analytically determined nodule template model combined with a central-symmetric 3D intensity model of the nodules. The template models can be irregularly shaped. Gray levels are made analytical in embodiments of the invention, where past efforts have used ad hoc radius and distribution of gray levels. The model closely approximates an empirical marginal probability distribution of image intensities in the real nodules of different size and is analytically identified from the empirical distribution. The impact of the new template model includes: (1) flexibility with respect to nodule topology—thus various nodules can be detected simultaneously by the same technique; (2) automatic parameter estimation of the nodule models using the gray level information of the segmented data; and (3) the ability to provide exhaustive search for all the possible nodules in the scan without excessive processing time—this provides an enhanced accuracy of the CAD system without increase in the overall diagnosis time.

In addition, it ahs also been shown that lung nodules can be monitored over time, despite their potential shape and size changes. Databases of false positives can be created and used to remove false positives in subsequent tests. Unlike prior techniques, the invention does not use a try and see approach to test for nodules, but uses an analytical process to search for nodules. An iterative search is conducted that can use various shapes and sized templates with analytically determined template. Embodiments of the invention account for the spread and shape of nodules that can be traced and changed with time.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for detecting a nodule, or other shaped target, in image data, the method comprising steps of:
    segmenting scanning information from an image slice to isolate lung tissue from other structures, resulting in segmented image data;
    extracting anatomic structures, including any potential nodules, from the segmented image data, resulting in extracted image data; and
    detecting possible nodules, or other shaped targets, from the extracted image data, based on deformable prototypes of candidates generated by a level set method in combination with a marginal gray level distribution method, wherein detecting possible nodules, or other shaped targets, includes:
        generating a deformable prototype by applying the level set method to the extracted image data;
        assigning gray levels to the deformable prototype using the marginal gray level distribution method; and
        determining similarity between gray levels in the extracted image data and the deformable prototype.

2. The method according to claim 1, wherein said step of detecting possible nodules includes evolving a surface of a deformable prototype using the following velocity function $F(x, y, z)$ during a propagation process:

$$F(x,y,z) = -h(x,y,z)(1+\epsilon k(x,y,z)),$$

where $h(x, y, z)$ is a local consistency term, $k(x, y, z)$ is a local curvature term, and $\epsilon$ is a smoothing factor.

3. The method according to claim 2, wherein said local consistency term is represented by:

$$h(x,y,z) = (1+|\nabla I(x,y,z)|)^{-1},$$

where $\nabla I(x, y, z)$ is a three dimensional gradient of said segmented image data.

4. The method according to claim 2, wherein a lowpass filter is applied after each step of said propagation process to keep the level set from propagating through any blood vessels connected to the possible nodule or other shaped target.

5. The method according to claim 1, wherein said marginal gray distribution method utilizes a marginal probability density function represented by:

$$\psi(q\mid q_{min}, q_{max}) = \frac{\ln q_{max} - \ln q}{q_{max} - q_{min}(1 + \ln q_{max} - \ln q_{min})},$$

where $q(r)$ is gray level function, $q_{min}$ is minimum gray level $q_{max}$ is maximum gray level.

6. The method according to claim 1, wherein said step of detecting possible nodules, or other shaped targets, includes:
    determining minimum gray level, $q_{min}$, and maximum gray level, $q_{max}$;
    propagating a voxel set U of an extracted object until reaching a steady state;
    calculating a centroid for the voxel set U;

calculating maximum radius, $R_{max}$, and minimum radius, $R_{min}$, of said centroid;

calculating average radius, R, using $R=(R_{min}+R_{max})/2$;

estimating scatter parameter, $\rho$, using $\rho=R(\ln q_{max} - \ln q_{min})^{-1/2}$ assigning prototype gray levels, $N_{x,y,z}$, for each extracted voxel, where (x, y, z)∈ of said voxel set U, using $q(r)= q_{max} \exp(-(r/\rho)^2)$, where r is a radius of said extracted object;

determining similarity between said extracted object $C=[C_{x,y,z}:(x, y, z) \in U]$ and gray level nodule prototype $N=[N_{x,y,z}:(x, y, z) \in U]$ using a normalized cross-correlation $Corr_{C,N}$ function; and classifying said extracted object as a nodule candidate when result of cross-correlation $Corr_{C,N}$ is greater than a predetermined parameter.

7. The method according to claim 6, further comprising a post-classification step using linear combinations of Gaussians (LCGs) for distinguishing between false positive nodules and true positive nodules.

8. The method according to claim 1, wherein said image data is obtained with a low dose computed tomography scanner.

9. The method of claim 1, wherein said step of detecting possible nodules includes generating at least one irregularly shaped deformable prototype.

10. The method of claim 1, wherein said step of detecting possible nodules includes evolving a surface of a deformable prototype.

11. The method of claim 1, wherein said step of detecting possible nodules includes generating a deformable prototype using the level set method and applying the marginal gray level distribution method to the deformable prototype after the deformable prototype is generated using the level set method.

12. An automatic method for detecting and monitoring a nodule or other shaped target in image data, the method comprising steps of:

determining adaptive probability models of visual appearance of small 2D and large 3D nodules or shaped targets to control evolution of deformable models to get accurate segmentation of pulmonary nodules from image data;

modeling a first set of nodules or shaped targets in image data with a translation and rotation invariant Markov-Gibbs random field of voxel intensities with pairwise interaction analytically identified from a set of training nodules;

modeling a second subsequent set of nodules or shaped targets in image data by estimating a linear combination of discrete Gaussians; and integrating models to guide the evolution of the deformable model to determine and monitor the boundary of each detected nodule or targeted shape in the image data.

13. The method according to claim 12, wherein said step of modeling a first set of nodules or shaped targets includes approximating potentials with scaled centered empirical probabilities:

$$V_{vox,nd}(q) = \left(f_{vox,nd}(q) - \frac{1}{Q}\right); (q) \in Q;$$

$$V_{v,nd}(q, q') = (f_{v,nd}(q, q^1) - \frac{1}{Q^2}); v \in N$$

where $\lambda$ is common factor computed analytically, Q is a finite set of gray levels, and N is a set of characteristic central-symmetric voxel neighborhoods.

14. The method of claim 13, wherein said step of modeling a first set of nodules or shaped targets includes:

determining energies that are equal to variances of co-occurrence distributions using:

$$E_{v,rel} = \sum_{q,q' \in Q^2} f_{v,nd}(q, q')\left(f_{v,nd}(q, q') - \frac{1}{Q^2}\right),$$

where E is energy, $f_{v,nd}$ (q, q') is the normalized joint co-occurrence frequency and Q is a finite set of gray levels;

ranking all central-symmetric neighborhoods from highest to lowest; and selecting the highest ranked central-symmetric neighborhood.

15. A diagnosis system, comprising:

A computer, having thereon a computer program, configured to:

detect a nodule, or other shaped target, in image data, by segmenting scanning information from an image slice to isolate lung tissue from other structures, resulting in segmented image data;

extract anatomic structures, including any potential nodules, from the segmented image data, resulting in extracted image data; and detect possible nodules, or other shaped targets, from the extracted image data, based on deformable prototypes of candidates generated by a level set method in combination with a marginal gray level distribution method, wherein the computer is further configured to detect possible nodules, or other shaped targets, by generating a deformable prototype by applying the level set method to the extracted image data, assigning gray levels to the deformable prototype using the marginal gray level distribution method, and determining similarity between gray levels in the extracted image data and the deformable prototype.

* * * * *